United States Patent

Yamada et al.

[11] Patent Number: 6,018,609
[45] Date of Patent: Jan. 25, 2000

[54] COMPRESSED TELEVISION SIGNAL RECORDING AND REPRODUCING APPARATUS

[75] Inventors: Masazumi Yamada, Moriguchi; Akira Iketani, Higashiosaka, both of Japan

[73] Assignee: Matsushita Electric Industrial Co., Ltd., Osaka, Japan

[21] Appl. No.: 08/912,344

[22] Filed: Aug. 18, 1997

Related U.S. Application Data

[63] Continuation of application No. 08/453,521, May 30, 1995, abandoned.

[30] Foreign Application Priority Data

May 31, 1994 [JP] Japan .................................. 6-118202

[51] Int. Cl.[7] .................................................. H04N 5/91
[52] U.S. Cl. .......................... 386/41; 386/83; 386/55
[58] Field of Search ........................ 386/83, 47, 41, 386/27, 33, 52, 55, 109, 111, 112, 124, 125; 360/8, 69

[56] References Cited

U.S. PATENT DOCUMENTS

| | | | |
|---|---|---|---|
| 4,777,537 | 10/1988 | Ueno et al. | 358/341 |
| 5,107,343 | 4/1992 | Kawai | 358/341 |
| 5,166,804 | 11/1992 | Takahashi | 358/341 |
| 5,239,382 | 8/1993 | Hatakenaka et al. | 358/335 |
| 5,438,423 | 8/1995 | Lynch et al. | 360/13 |
| 5,448,371 | 9/1995 | Choi | 386/125 |
| 5,455,684 | 10/1995 | Fujinami et al. | 358/335 |
| 5,488,409 | 1/1996 | Yuen et al. | 386/83 |
| 5,640,484 | 6/1997 | Mankovitz | 386/83 |

FOREIGN PATENT DOCUMENTS

| | | |
|---|---|---|
| 0341319 | 11/1989 | European Pat. Off. ...... G11B 15/087 |
| 0579156 | 7/1993 | European Pat. Off. . |

*Primary Examiner*—Brian L. Casler
*Assistant Examiner*—Luanne P. Din
*Attorney, Agent, or Firm*—Greenblum & Bernstein, P.L.C.

[57] ABSTRACT

In a compressed signal recording and reproducing apparatus, a table-of-contents generator extracts user selected representative frames from among frames of an input compressed television signal that can be identified by specified additional information, and generates table-of-contents data representing contents of a specified number of the user selected representative frames. A recording signal processor arranges the input compressed television signal, table-of-contents data, and positional information relating to positions for recording the individual user selected representative frames data, respectively, at specified positions of the recording medium. The apparatus further includes a reproduction signal processor for outputting table-of-contents data recorded at a specified position in the recording medium for exhibiting contents of a plurality of user selected representative frames, from among the reproduction data.

33 Claims, 8 Drawing Sheets

COMPRESSED TELEVISION SIGNAL RECORDING AND REPRODUCING APPARATUS

This application is a continuation of application No. 08/453,521, filed May 30, 1995, now abandoned.

BACKGROUND OF THE INVENTION

1. Field of the Invention

The present invention relates to a compressed television signal recording and reproducing apparatus for recording television signals compressed by means of a high efficiency compression algorithm and for reproducing the compressed television signals to a decoder.

2. Description of the Prior Art

High efficiency digital coding technologies for video and other image signals have progressed significantly in recent years. Particular attention has been given to inter-frame predictive coding techniques as a means of reducing redundancy on the time-base axis, and international standards for video signal coding techniques have been established. One of these is the ISO-13818 specification, which is commonly known as MPEG-2 for the Motion Picture Expert Group of the ISO.

This method reduces redundancy on the time base by inter-frame predictive coding, and reduces redundancy on the spatial base by discrete cosine transformation (DCT) coding. Predictive error is reduced by motion compensation during inter-frame prediction to improve coding efficiency. The coded data is generally recorded using variable length block units, macro block units, MBS units, picture units, and group-of-picture (GOP) units.

Systems for combining and packetizing the video and audio coded data in an MPEG signal have been established as a means of transmitting such variable length coded data. In this system, the coded data is first converted to variable length packets called a "packetized elementary stream" (PES); these PES packets are then divided into fixed length packets called the "transport stream packets" (TSP). Auxiliary information used, for example, to synchronize the audio and video or to identify multiplexed programs is also written to the TSP.

As described in *An experimental study on a home-use digital VCR* (IEEE International Conference on Consumer Electronics, Jun. 6–9, 1989; WPM8.6), when recording a base band signal in a digital video cassette recorder (DVCR), the input video signal is compressed, then an error correction signal is added to the compressed video signal for coding the signal for recording, and the coded signal is then recorded on a magnetic tape. During reproduction, the signal read from the magnetic tape is detected and processed for error correction, and then decoded to output the video signal. Note that the video signal is recorded to the magnetic tape in fixed length packet units.

When an MPEG or other compressed television signal is recorded and reproduced, the signal is packetized in units of a fixed number of bits in the transmission sequence of the signal sent from the encoder. During reproduction, the read-out packets are reconnected in the sequence to reproduce the original signal, which is then transmitted to the decoder.

With this conventional method, however, the following problems develop when the input data is data compressed by inter-frame coding as in the case of MPEG signals.

Specifically, during fast forward, fast reverse and other special reproduction modes, since a reproducing head scans across the recording tracks, it is impossible to reproduce frame data or to reproduce auxiliary signals necessary for the decoder to perform the decoding operation.

Secondly, it is also impossible to know contents of individual portions of a recording tape which are recorded on the tape over, for example, two hours or so.

SUMMARY OF THE INVENTION

The object of the present invention is to solve the above-described problems of the conventional signal recording and reproducing apparatus. More particularly, the object of the present invention is to make known the contents of individual recorded portions of the tape.

The compressed television signal recording and reproducing apparatus according to a first aspect of the present invention comprises;

on its recording portion, a table-of-contents data generating means for extracting representative frames that can be identified by specified additional information, from among frames of an input compressed television signal, and then generating table-of-contents data representing contents of a specified number of said representative frames; an arrangement means for arranging the input compressed television signal at a first specified position of a recording medium, arranging the table-of-contents data at a second specified position of the recording medium, and arranging positional information relating to positions for recording the individual representative frames data at a third specified position of the recording medium; and a recording means for recording the data arranged by said arrangement means onto the recording medium, the apparatus further comprising:

on its reproduction side, a reproducing means for obtaining reproduction data by reproducing data recorded in a recording medium; a table-of-contents data output means for outputting table-of-contents data recorded at a specified position in the recording medium for exhibiting contents of a plurality of representative frames, from among the reproduction data; a selection information acquiring means for acquiring information from an external device as to which to select among the representative frames exhibited by the table-of-contents frame; and an output means for delivering an output signal containing data of a representative frame selected by the selection information acquiring means out of the representative frames.

By this arrangement, since table-of-contents frames are recorded independently, a table-of-contents frame can be easily reproduced in the reproduction mode. Further, since the relationship of the representative frames exhibited in a table-of-contents frame to the position on the recording medium, it becomes possible to easily move to a position where a representative frame selected in the reproduction mode is recorded.

According to another feature of the present invention, the table-of-contents frames are recorded independently, whereby it becomes easy to reproduce a table-of-contents frame in the reproduction mode. Further, the relationship between programs within a signal transmitted with a plurality of programs multiplexed and the representative frames exhibited within the table-of-contents frame is recorded. By this arrangement, it becomes possible to easily select a program of the representative frame selected in the reproduction mode.

Moreover, according to further another feature of the present invention, the compressed television signal recording and reproducing apparatus comprises, a positional information extracting means for extracting positional information of data of one representative frame selected out of the representative frames, and a search means for searching for a position on the recording medium exhibited by the representative frame according to the obtained positional information and for making a reproduction started at the position on the recording medium.

By this constitution, a table-of-contents frame can be reproduced from the recording medium on which table-of-contents frames are recorded independently. Further, it becomes possible to easily move to a position where a selected is representative frame is recorded, based on the relationship between the representative frame exhibited within the table-of-contents frame and the position an the recording medium.

Moreover, according to another further feature of the present invention, the compressed television signal recording and reproducing apparatus comprises, an identification information extracting means for extracting identification information for identifying data of one representative frame selected by the selection information acquiring means out of the representative frames, and an identifying means for identifying the reproduction signal by using the identification information.

By this constitution, a table-of-contents frame can be reproduced from the recording medium on which table-of-contents frames are recorded independently. Further, it becomes possible to easily select a program of a selected representative frame, by confirming the relationship between the programs within a signal transmitted and multiplexed with a plurality of programs and the representative frames exhibited within the table-of-contents frame.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENTS

The embodiments of the present invention will be described hereinbelow with reference to the accompanying drawings. It is to be noted that components denoted by like numerals have the same construction and function throughout the description.

EMBODIMENT 1

Figure 1:
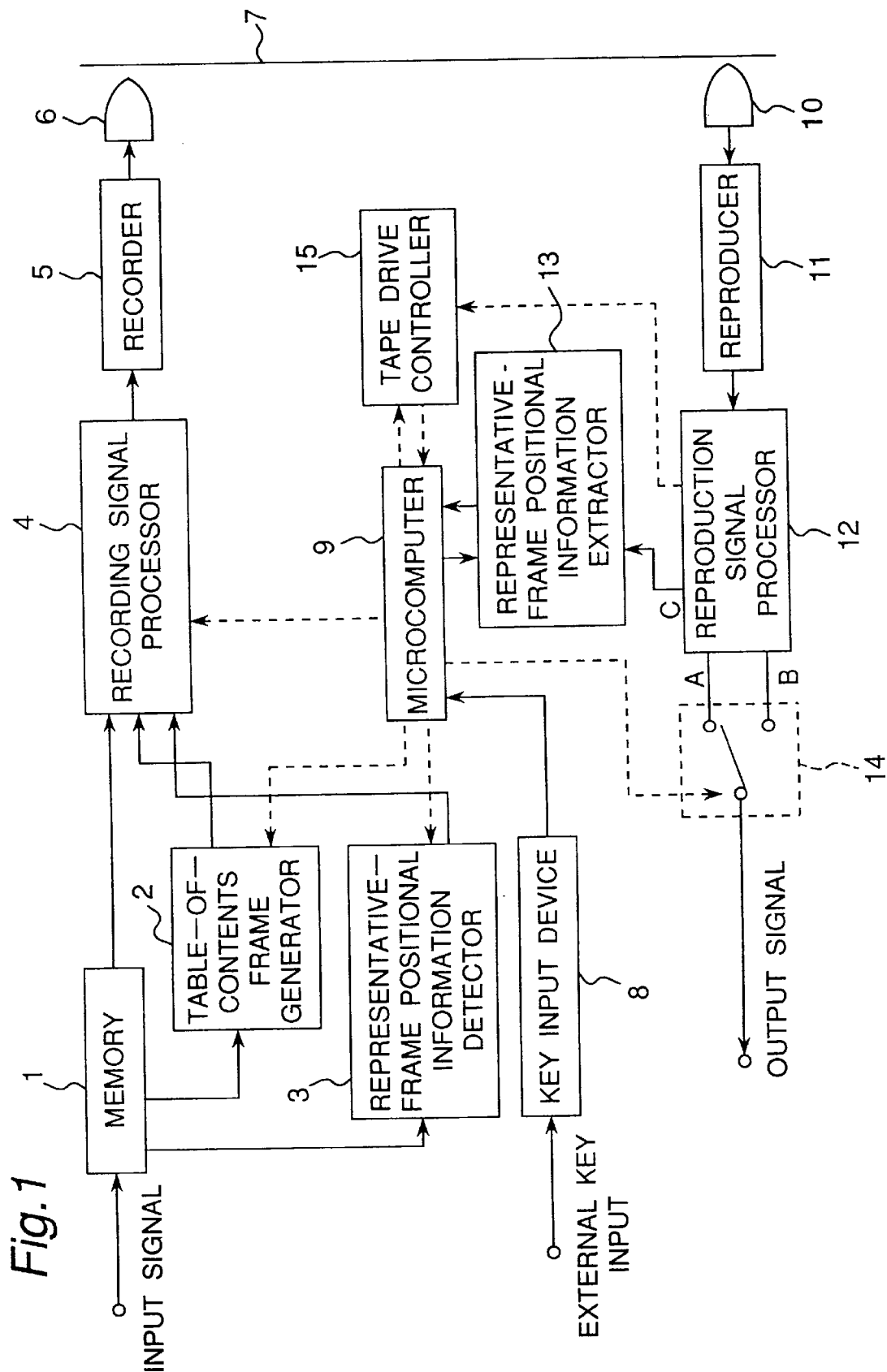
FIG. 1 is a block diagram of a recording and reproducing apparatus for explaining a first, third and fourth embodiments of the present invention.

FIG. 1 shows a construction of a compressed television signal recording and reproducing apparatus according to a first embodiment of the present invention Referring to FIG. 1, the compressed television signal recording and reproducing apparatus of the first embodiment comprises a memory 1 for storing input signals supplied via an input terminal, a table-of-contents frame generator circuit 2 connected between the memory 1 and a recording signal processor circuit 4 for generating a table-of-contents frame, a representative frame positional information detector circuit 3 also connected between the memory 1 and the recording signal processor circuit 4 for detecting a representative frame positional information. The inputs of the recording signal processor circuit 4 are connected to the outputs of the memory 1, table-of-contents frame generator circuit 2 and representative frame positional information detector circuit 3. The output of the recording signal processor circuit 4 is connected to a magnetic recording tape 7 serving as a recording medium via a recorder circuit 5 and via a recording head 6. The magnetic recording tape is an example of a sequential-access recording medium, i.e., a recording medium in which data is recorded or accessed in order, as opposed to a random-access recording medium, in which data may be recorded or accessed in any order.

The apparatus further comprises a key input device 8 for inputting external data via a key input, and a microcomputer 9 for controlling various parts of the apparatus. The apparatus further comprises a reproducer circuit 11 for reproducing data from the recording medium 7 via a reproducing head 10. The output of the reproducer circuit 11 is connected to a reproduction signal processor circuit 12 the outputs (A, B) of which are further connected to a selector switch 14 and another output (C) of which is connected to a representative frame positional information extractor 13. The representative frame positional information extractor 13 for extracting representative frame positional information is connected between the microcomputer 9 and the reproduction signal processor circuit 12. The apparatus further comprises a tape drive controller circuit 15 for controlling a tape drive based on a command from the microcomputer 9.

The operation of the compressed television signal recording and reproducing apparatus thus constructed is described below.

It is to be noted that, as an input compressed television signal applied to the apparatus of the present embodiment, not only the image signal data but also audio signal data and added information signal data when required are inputted to the apparatus.

When a user intends to operate the apparatus while setting in a recording mode, the user commands the microprocessor 9 by operating the key input device 8 to specifically set the apparatus to the recording mode.

As to the selection and designation of a representative frame, the user selects and designates, as the representative frame, a scene well representing the contents of each scene on the memory 1 via the key input device 8 during a search process from among the compressed television signal accumulated in the memory 1.

When there in no such selection of a representative frame specified by a user, an index code identifying a track at which the recording/stopping process starts is recorded each time starting of the recording and stopping operation, and the corresponding frame of that portion is designated as a representative frame. Alternatively, borders between commercials and programmed subject matters may be detected and recorded each time it happens, and the frames at which these codes are recorded can be used as the representative frames. As described above, the representative frames may be selected and designated using any of these or similar operations. The image data selected as the representative frames is once stored in the memory 1.

The representative frame positional information detector circuit 3 detects a recording track of the magnetic tape to which these representative frames are located, and outputs the track number of the detected frame positions as the representative frame address information.

Once the representative frames are selected and the addresses thereof are determined, then the table-of-contents frame generator circuit 2 compiles a table-of-contents frame using the representative frames. Namely, the table-of-contents frame generator 2 generates table-of-contents data representing contents of a specified number of the representative frames by extracting representative frames that can be identified by specified additional information, from among frames of an input compressed television signal.

Figure 9:
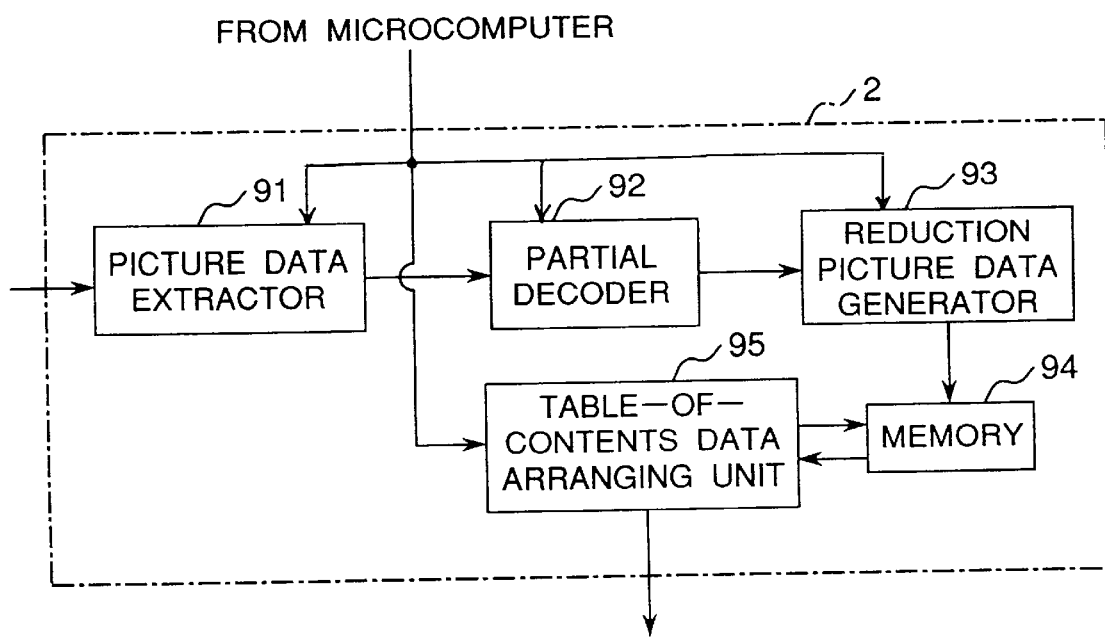
FIG. 9 is a block diagram showing a construction of a table-of-contents frame generator.

FIG. 9 shows a construction of the table-of-contents frame generator 2 which comprises an image picture data extractor 91, a partial decoder 92, a reduction picture data generator 93, a memory 94, and a table-of-contents data arranging unit 95.

Figure 5:
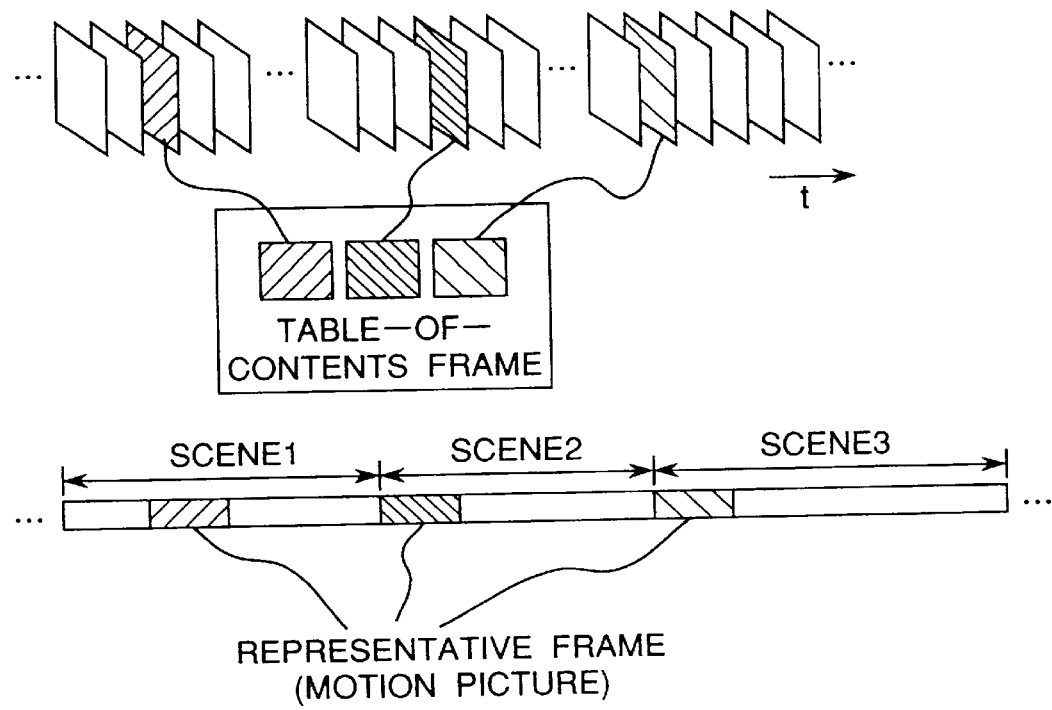
FIG. 5 is a view for explaining a representative frame and table-of-contents frame of the present invention.

In response to a timing control generated by the microcomputer 9, the image picture data extractor 91 extracts only the image signal data selected as the representative frames on the memory 1, and then the extracted data is fed to the partial decoder 92 where data of partial components, for example, of a D.C. signal portion of each block is decoded. The decoded D.C. signal data of each block corresponds to an average value of the data in each block, which corresponds to the value of the pixels in the case where a reduced frame is produced regarding each block as one pixel. The resultant data of each pixel of the reduced frame is divided into blocks by means of the reduction picture data generator 93. Thereafter, the contents of each resultant block are coded in a format of an image picture data to thereby obtain the reduction image picture data. The reduction image picture data is fed from the reduction picture data generator 93 to the table-of-contents data arranging unit 95 via the memory 94 for storing the reduced frame data, and then the reduction image picture data are rearranged and synthesized in groups each containing a predetermined number of images to thereby sequentially generate multiple table-of-contents frames as shown in FIG. 5.

In this embodiment, although only the D.C. components are extracted and decoded by the partial decoder 92, this decoding operation can be made while containing other DCT coefficients.

Moreover, when the contents in each of the blocks are coded in a format of image data by means of the reduction picture data generator 93, the discrete cosine transformation (DCT) can be utilized for coding. Alternatively, by calculating the average value, only the D.C. components are calculated to be coded. Otherwise, by providing ROM or the like, a corresponding coded data can be read.

In this process, the table-of-contents frame generator generates table-of-contents data in such a data format as to be decodable by a decoding device associated with the input compressed television signal.

By formatting this multiple image frame in the same data-format used for formatting single images, it is possible, even in a recording medium containing both motion and still images, to reproduce images from the multiple representative frames in an index frame format. Thus, the user can efficiently determine the content of the recording medium even though only the image signal data containing the added information desired by the user is displayed in a compressed format.

In addition, because the recording position of the original frames from which the reduced index images were generated is recorded as auxiliary information to a predetermined recording area, it is possible to easily execute high speed searches for locating and reproducing the desired content. It is to be noted that the representative frame is not necessarily required to be a still image, and the multiple frame can be implemented even for image data of motion pictures. Namely, even motion image frames can be indexed to is the multiple image frame.

Figure 6:
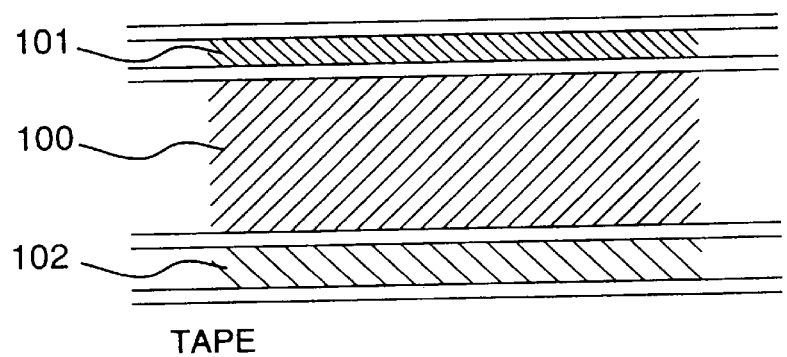
FIG. 6 is a view showing an example of data arrangement on the recording medium of the present invention.

The recording signal processor circuit 4 multiplexes the input compressed television signal, the table-of-contents data and positional information relating to positions for recording the individual representative frames data to be arranged respectively at specified areas 100, 101 and 102 of the recording medium, as shown in FIG. 6. The recording signal processor 4 repeatedly arranges the table-of-contents data a plural number of times.

In more detail, the recording signal processor circuit 4 multiplexes the input compressed television data, table-of-contents data and positional information data of the representative frames so that the input data from the memory 1 is recorded to the first area 100, as shown in FIG. 6, and that the table-of-contents data supplied from the table-of-contents frame generator 2 is recorded to the second area 101, and that the positional information data supplied from the representative-frame positional information detector 3 is recorded to the third area 102, and then the multiplexed signal is outputted from the recording signal processor 4 in a multiplexed fashion, which the resultant signal is to be supplied to the recorder circuit 5.

The recorder circuit 5 then applies error correction coding to the multiplexed signal data, and further modulates the resultant signal for recording. The modulated data signal output from the recorder circuit 5 is recorded onto the magnetic recording medium 7 such as a magnetic tape via the recording head 6.

Next, the operation of reproducing data in the apparatus during a reproduction mode will be described hereinbelow.

The data signal read out from the magnetic tape 7 via the reproduction head 10 is subjected to demodulation and error correction by means of the reproducer circuit 11 the output of which is applied as the reproduction signal to the reproduction signal processor circuit 12. The reproduction signal processor circuit 12 determines the location of the original recording packet based on the header information of the present recording packet and the like with respect to the reproduction signal. It is to be noted here that the location of the original recording packet denotes as to at which position on the recording medium was recorded each recording packet of the signal obtained in the reproduction operation, namely, as to which number of sync block (i.e., recording packet) on which number of track in the case of a magnetic recording tape.

The recording packets belonging to the areas 100, 101, and 102 as shown in FIG. 6, respectively, are outputted in batch in the sequence they were recorded, as a signal. A used for normal reproduction modes, as a signal B used for table-of-contents frame display, and as a signal C having such auxiliary data as the positional information of the recorded representative frames used for extracting representative-frame positional information.

When the user chooses to display the table-of-contents frame by means of the key input device 8, the microcomputer 9 controls the switch 14 to select the signal B to be output, thus outputting the table-of-contents frame data to an external device to be displayed. If the table-of-contents frame data is formatted identically to the normal reproduction mode data, a decoder (not shown) externally connected the apparatus can directly decode the table-of-contents frame data, and the table-of-contents frame can thus be displayed.

In the meantime, the recorder circuit 5 may be controlled by the microcomputer 9 so as to record, at a desired position in the recording medium 7, switching information for switching between a reproduction output (B) of table-of-contents data and a reproduction output (A) of input compressed television data in the output operation process.

It is to be noted that the table-of-contents data may include not only image data but also audio data. When audio data is also included in the table-of-contents data, it is also possible to reproduce the audio data corresponding to user manipulation of the key input device 8 when the table-of-contents is displayed, or to reproduce audio data related to or describing the representative frames in the displayed table-of-contents.

Alternatively, the table-of-contents data generator 2 may reproduce image picture data of the representative frames out of image picture data of a compressed television signal that has previously been recorded on the recording medium, and thereafter generates table-of-contents data using the image picture data of a specified number of the representative frames.

When the user has selected by the key input device 8 a frame for which the user desires to search, from among the representative frames in the displayed table-of-contents frame, the microcomputer 9 informs the representative-frame positional information extractor 13 of the number of the selected representative frame desired to be searched from among three reduction frames displayed in the table-of contents frame as shown in FIG. 5. The representative-frame positional information extractor 13 restores the track position of the selected representative frame among from the signal C supplied from the reproduction signal processor 12, and then the restored track position of the selected representative frame is transmitted to the microcomputer 9.

The microcomputer 9 commands the tape drive control circuit 15 to fast-forward or fast-reverse the tape to the restored track position. The tape drive control circuit 15 fast-forwards or fast-reverses the tape while comparing the track numbers recorded on the tape with reference to the targeted track position. When the tape drive reaches the targeted track position, the operation mode of the apparatus is switched to a normal reproduction one, and the normal reproduction of data signal is started.

At this stage, the switch 14 is turned over to output the signal A, and the input signal portion indicated by the representative frame is restored and output to the external devices. Over these steps of operation, the scene represented by the table-of-contents frame display and the search of the selected representative frame can be retrieved.

Figure 2:
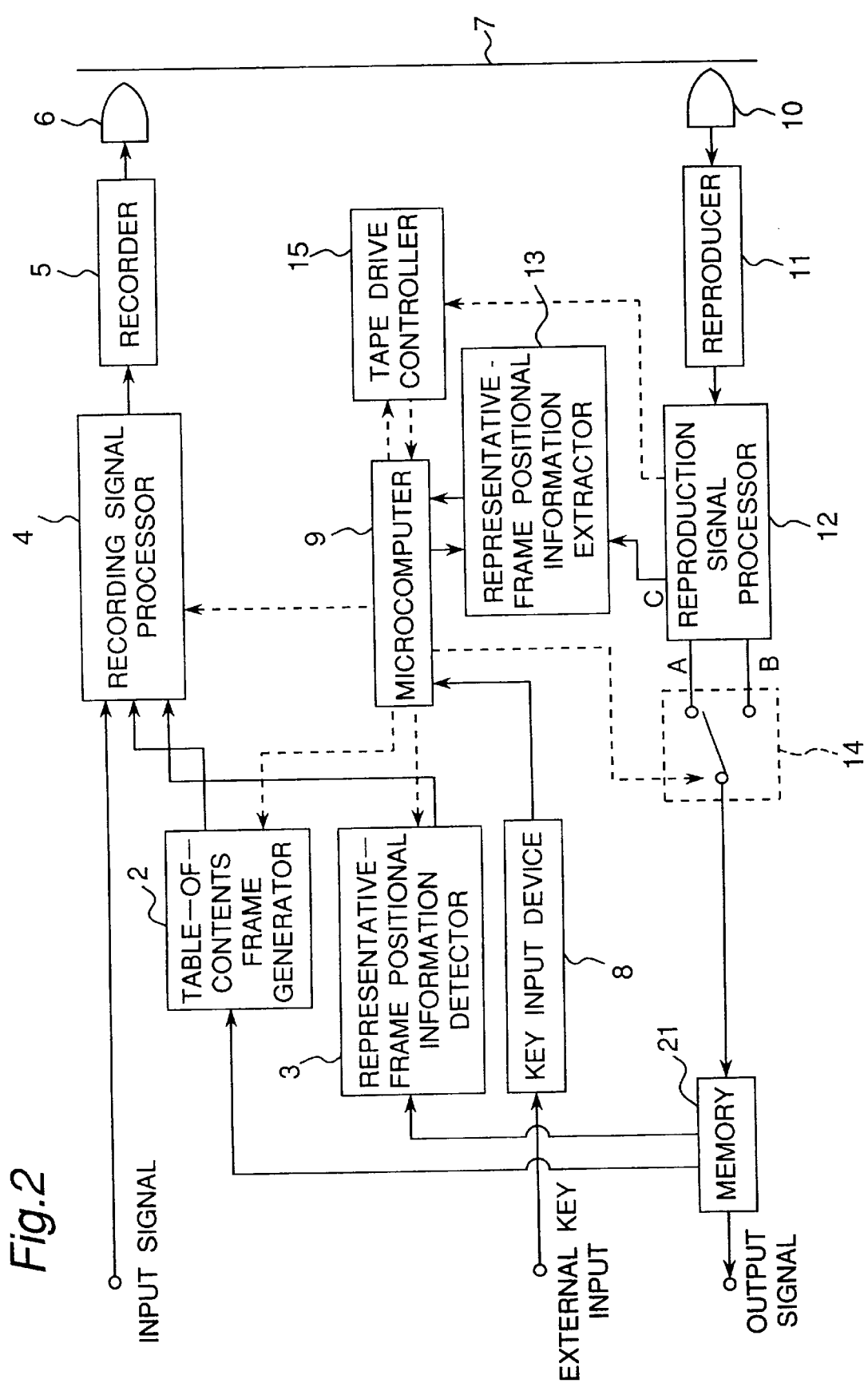
FIG. 2 is a block diagram of a recording and reproducing apparatus according to a second embodiment of the present invention.

FIG. 2 shows a construction of a compressed television signal recording and reproducing apparatus according to a second embodiment of the present invention.

Referring to FIG. 2, the apparatus of the second embodiment has a similar construction to that of the first embodiment except for the feature that a memory 21 is connected between the output terminal of the apparatus and the selector switch 14 so that the output data of the selector switch 14 is outputted to the external via the memory 21.

The compressed television signal recording and reproducing apparatus of this embodiment comprises, a table-of-contents data generator 2 for generating data of a table-of-contents frame, a recording signal processor 4 for arranging the input compressed television signal at a first specified position 100 of the recording medium, arranging the data of a table-of-contents frame at a second specified position 101 of the recording medium, and arranging identification information of the individual representative frames at a third specified position 102 of the recording medium.

In the second embodiment with the above constitution shown in FIG. 2, since the table-of-contents frames are recorded independently, it becomes easy to reproduce a table-of-contents frame in the reproduction mode. Further, since the relationship between programs within a signal transmitted with a plurality of programs multiplexed and the representative frames exhibited within the table-of-contents frame is recorded, then it becomes possible to easily select a program of the representative frame selected in the reproduction mode.

In more detail, the operation of the compressed television signal recording and reproducing apparatus constructed as described above is now described while set in the normal recording and reproduction mode.

When the user designates the microcomputer 9 to set the apparatus to be operated in a recording mode via the key input device 8, the apparatus turns into the recording mode. An input compressed television signal is directly supplied to the recording signal processor circuit 4 via an input terminal of the apparatus. The input compressed television signal is so formatted as to be recorded at an area 100 shown in FIG. 6 by the recording signal processor circuit 4.

The signal output from the recording signal processor 4 is fed to the recorder circuit 5 where the recording-formatted signal is added with an error correcting code and further modulated to thereby obtain modulated signal data. The resulting modulated data signal is recorded onto the recording medium 7 by means of the recording head 6.

Next, the operation of selecting a representative frame is described hereinbelow. The selection of a representative frame is designated to the microcomputer 9 via the key input device 8 by the user, and the apparatus turns to the representative-frame selection mode by this designation. A reproduction signal derived from the recording medium 7 via the reproduction head 10 is subjected to demodulation and error correction by means of the reproducer circuit 11, and then the resultant signal is outputted to the reproduction signal processor circuit 12 as a reproduction signal.

The reproduction signal processor circuit 12 discriminates the position of the original recording packet based on the header information and the like of the recording packet with respect to the reproduction signal. Recording packets belonging to the area 100 are restored and outputted as a signal A for use in the normal reproduction mode. The user selects a scene well representing the contents of individual scenes as the representative frames during a search process while viewing the reproduced contents and designates the scenes as the representative frames via the key input device 8.

The representative-frame positional information detector 3 detects which track the frame selected as the representative frame is located on the tape, and outputs the detected track number as the representative-frame positional information data to be applied to the recording signal processor 4. Thus, the user can be informed of the correspondence between the representative frame and the track number on the tape on which the portion represented by the representative frame is recorded.

Next, since the operation of the table-of-contents frame generator 2 is the same as in the first embodiment, its description is omitted here. However, it is necessary that the area 101 shown in FIG. 6 where table-of-contents data is recorded can be overwritten independently of the area 100 where the input data has been recorded.

The reproduction mode is also the same as in the first embodiment, and its description is omitted here. In the present embodiment, the representative frame car be selected while the contents that have already been recorded on the recording medium are being reproduced. Thus, the volume of the memory 21 can be smaller than the memory 1 as a further advantage.

Figure 3:
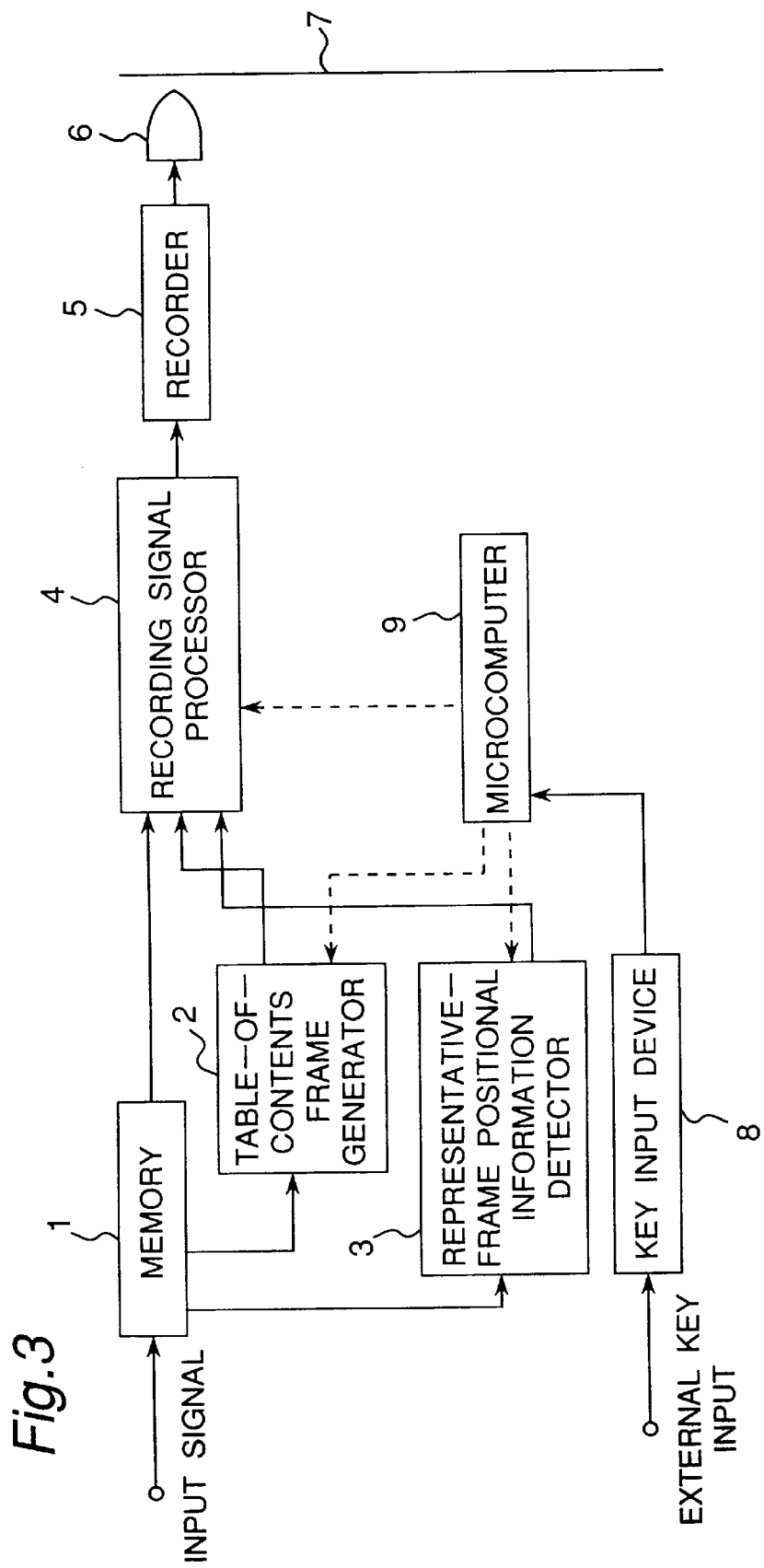
FIG. 3 is a block diagram of a recording and reproducing apparatus according to a third embodiment of the present invention.

FIG. 3 shows an essential feature of a recording and reproducing apparatus according to a third embodiment of the present invention.

As shown in FIG. 3, the apparatus of the present embodiment is of the same construction and operation as in the case where only the recording portion in the first embodiment shown in FIG. 1 is concerned.

In this embodiment, referring to FIGS. 1 and 3, the table-of-contents data generator 2 reproduces only image data of representative frames that can be identified by specified additional information, from among a compressed television signal that has previously been recorded on a recording medium, and then generates table-of-contents frame data representing contents of a specified number of representative frames. In this case, the recording signal processor 4 arranges the input compressed television signal at a first specified area 100 of a recording medium, arranging the table-of-contents data at a second specified area 101 of the recording medium, and arranging identification information for identifying data of the individual representative frames at a third specified area 102 of the recording medium.

By recording table-of-contents data on the recording medium as in the present embodiment, a tape that can afford to display a table-of-contents frame in the reproduction mode can be produced. This is effective particularly for prerecorded tapes on which software has been recorded for sales purpose.

Figure 4:
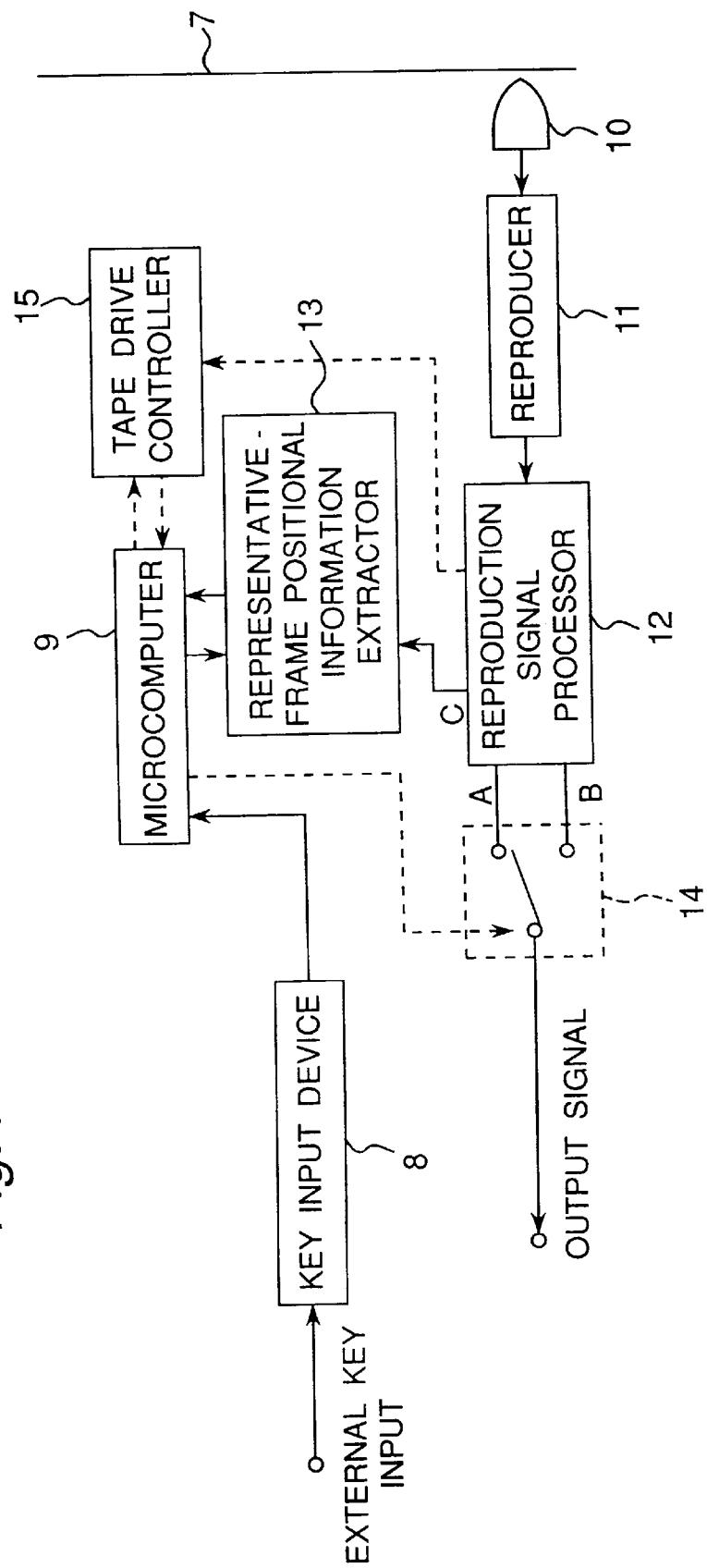
FIG. 4 is a block diagram of a recording and reproducing apparatus according to a fourth embodiment of the present invention.

FIG. 4 shows a construction of a recording and reproducing apparatus according to a fourth embodiment of the present invention.

Referring to FIG. 4, the apparatus of the present embodiment is of the same construction and operation as in the case where only the reproduction portion in the first embodiment shown in FIG. 1 is concerned.

In this embodiment, referring to FIGS. 1 and 4, reproduction data is obtained by reproducing data recorded on a recording medium. The table-of-contents data has been recorded for exhibiting contents of a plurality of representative frames and has been recorded at a specified position 101 in the recording medium. The information as to which to select out of the representative frames exhibited by the table-of-contents frame is acquired from the external via the key input device 8. The positional information extractor 13 extracts positional information relating to the recording position of data of one representative frame selected by the user from among the representative frames. The tape drive controller 15 serving as a search means searches for a position on the recording medium exhibited by the representative frame according to the obtained positional information and makes a reproduction started at the position on the recording medium.

By this constitution, a table-of-contents frame can be reproduced from the recording medium on which table-of-contents frames are recorded independently. Further, it becomes possible to easily move to a position where a selected representative frame is recorded, based on the relationship between the representative frame exhibited within the table-of-contents frame and the position on the recording medium.

In a deck main body of the present embodiment, the components on the recording side portion are omitted for lower prices, so that table-of-contents data are not generated. However, the display of a table-of-contents frame is possible when a tape on which software has been recorded is reproduced for sales purpose, as an advantage.

Figure 7:
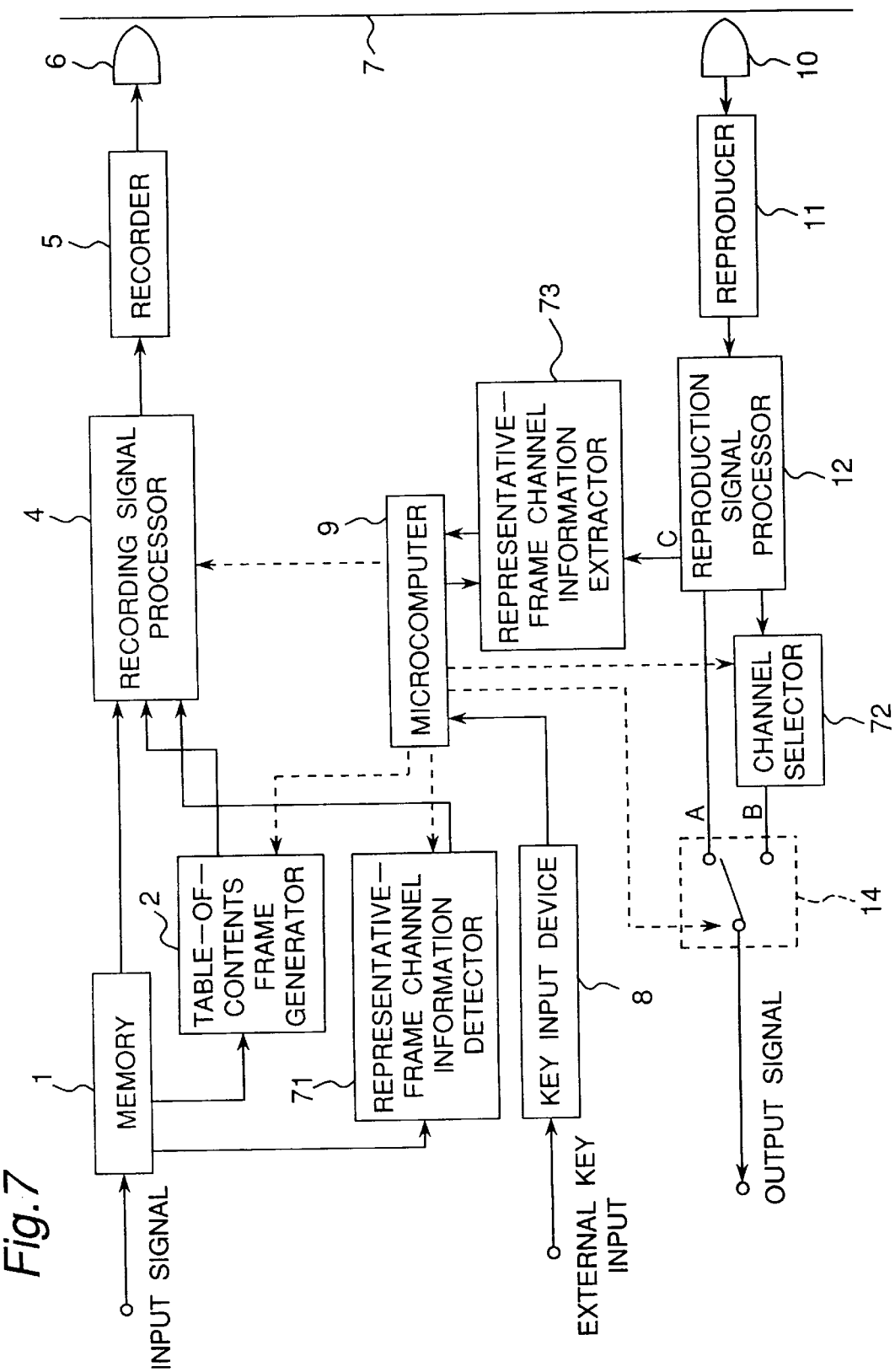
FIG. 7 a block diagram of a recording and reproducing apparatus according to a fifth embodiment of the present invention.

FIG. 7 shows a construction of a recording and reproducing apparatus according to a fifth embodiment of the present invention.

Referring to FIG. 7, the apparatus of the fifth embodiment has a similar construction to that of the first embodiment except for the features that, a representative-frame channel information detector circuit 71 and a representative-frame channel information extractor 73 shown in FIG. 7 are provided instead of the representative-frame positional information detector circuit 3 and the representative-frame positional information extractor circuit 13 shown in FIG. 1, respectively, and that a channel selector 72 is added between the reproduction signal processor 12 and the selector switch 14 while removing the tape drive controller 15 of FIG. 1.

The operation of the compressed television signal recording and reproducing apparatus of the fifth embodiment is described below.

The recording and reproducing apparatus is supplied with a multiplexed compressed television signal as its input signal in which compressed television signals of multiple channels are multiplexed. When the user designates a recording mode to the microcomputer 9 via the key input device 8, the apparatus is put into the recording mode.

Figure 8:
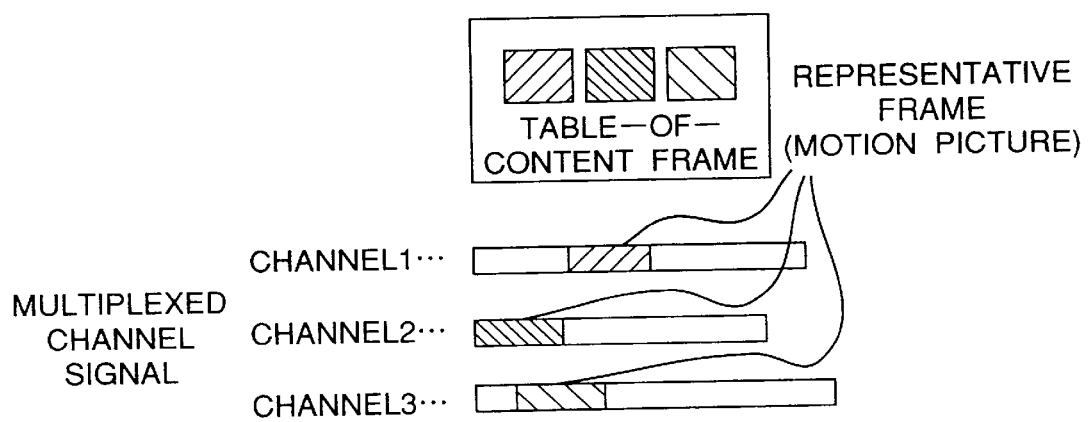
FIG. 8 is a view for explaining a representative frame and table-of-contents frame in the fifth embodiment of the present invention.

The user selects and designates via the key input device 8 a scene well representing the contents of scenes of individual channels as a representative frame as shown in FIG. 8 during a search process, from among the compressed television signal accumulated in the memory 1.

With no designation by the user, picture and audio data of each channel at that time are extracted, and the frame of the extracted portion is regarded as a representative frame. Otherwise, a boundary between a commercial and a program is detected, and a video signal and an audio signal that come immediately after the commercial are recorded for each channel, so that the frame of that portion is regarded as a representative frame. The representative frame may be selected by either one of the above two types of operation.

The representative-frame channel information detector circuit 71 detects a relationship between the number of the frame selected as the representative frame and the number of a transmission channel transmitted from a broadcasting station, which is, for example, a so-called PID code for classifying transmission packets in the MPEG, and then outputs the detection result as channel information data.

Next, a table-of-contents frame is generated based on the representative frame by the table-of-contents frame generator circuit 2. The process of generating table-of-contents data is the same as in the first embodiment, thus its description being omitted here.

The recording signal processor circuit 4 multiplexes the input data supplied, table-of-contents data and positional information data, so that the input data from the memory 1 is recorded to an area 100, as shown in FIG. 6, the table-of-contents data supplied from the table-of-contents frame generator 2 is recorded to an area 101, and the positional information data supplied from the representative-frame positional information detector 3 is recorded to an area 102, and then the multiplexed signal is outputted from the recording signal processor 4 in a multiplexed fashion to be supplied to the recorder circuit 5.

It is to be noted that, in the present embodiment, by recording the motion pictures of the channels at the same time point as the representative frames, in parallel to the area 101, it is easily known what are the contents of data in each channel of the input signal that has been recorded at the area 100 at the same time point.

The recorder circuit 5 then applies error correction coding to the multiplexed signal data, and further modulates the resultant signal for recording. The modulated data signal output from the recorder circuit 5 is recorded onto the magnetic recording medium 7 such as a magnetic tape via the recording head 6.

Next, the reproduction operation of the apparatus during a reproduction mode will be described hereinbelow.

The data signal read out from the magnetic tape 7 via the reproduction head 10 is subjected to demodulation and error correction by means of the reproducer circuit 11 the output of which is applied as the reproduction signal to the reproduction signal processor circuit 12. The reproduction signal processor circuit 12 determines the location of the original recording packet based on the header information of the present recording packet and the like with respect to the reproduction signal. The recording packets belonging to the areas 100, 101, and 102 as shown in FIG. 6, respectively, are outputted in batch in the sequence they were recorded, as a signal A used for normal reproduction modes, as a signal B used for table-of-contents frame display, and as a signal C having such auxiliary data as the positional information of the recorded representative frames used for extracting representative-frame positional information.

When the user chooses to display the table-of-contents frame by means of the key input device 8, the microcomputer 9 controls the switch 14 to select the signal B to be output, thus outputting the table-of-contents frame data to an external device to be displayed. If the table-of-contents frame data is formatted identically to the normal reproduction mode data, a decoder (not shown) externally connected the apparatus can directly decode the table-of-contents frame data, and the table-of-contents frame can thus be displayed.

When the user has selected by the key input device 8 a frame for which the user desires to search, from among the representative frames in the displayed table-of-contents frame, the microcomputer 9 informs the representative-frame channel information extractor 73 of the address number of the selected representative frame. The representative-frame channel information extractor 73 restores the channel number of the selected representative frame out of the signal C, and informs the microcomputer 9 of the restored channel number. The microcomputer 9 transmits the resulting channel number to the channel selector circuit 72. The channel selector circuit 72 outputs only a transmission packet having the transmitted channel number, and in some cases, generates also a dummy packet for making the rate constant.

Over the above steps of operation, the program of the channel indicated by the table-of-contents frame display and the selected representative frame can be selected and produced. This function can be utilized as an index of contents when a plurality of software items are recorded on the recording medium, allowing an easy search and reproduction of software on the recording medium.

By this constitution, a table-of-contents frame can be reproduced from the recording medium 7 on which table-of-contents frames are recorded independently. Further, it becomes possible to easily select a program of a selected representative frame, based on the relationship between the programs within a signal transmitted while multiplexing a plurality of programs, with the representative frames exhibited within the table-of-contents frame.

Although the MPEG signal has been taken as an example of the compressed television signal in the present embodiment, it may be replaced with other compressed television signals.

Also although the track arrangement as shown in FIG. 6 has been illustrated as an example of the recording areas, the arrangement thereof is at discretion. In addition, if the areas 101, 102 are overwritable independently of the area 100, it is possible to record and generate table-of-contents data separately, which is advantageous in terms of apparatus construction and data generation time.

Also, although a particular channel signal has been selected out of a multiplexed signal by an internal channel selection circuit, yet it is also possible to output signals of all the channels and select one by using a channel selection function built in an external decoder. In this case, the user's operability with the decoder can be facilitated by finding the channel number of the representative frame selected by the representative-frame channel information detector 71, and by displaying the channel number on external, or the user can be made easier to switch the channel, by sending an operation signal from the deck for a channel switch to the decoder.

According to the present embodiment as described hereinabove, it is facilitated to reproduce a table-of-contents frame during reproduction mode by recording a table-of-contents frame separately to the program content, and it is also facilitated to move quickly to the recording location of the selected representative frame during reproduction by further recording the relationship between the representative frames displayed in the table-of-contents frame and the recording positions of said representative frames on the recording medium.

In addition, the program of the representative frame selected during reproduction can be easily located and reproduced by recording the relationship between each of the plural programs in the multiplexed input signal and the representative frames shown in the table-of-contents frame.

Furthermore, it should be noted that the embodiments described hereinabove shall not be limited to the configurations shown in the block diagrams therefor, and various other configurations are possible with the same equivalent effects. In addition, signal processing whereby the equivalent effects are obtained can also be achieved by means of a signal processor and software.

The recording and reproducing parts of the aforementioned embodiments can also be provided separately in discrete apparatuses.

The number of channels multiplexed to a plural channel multiplexed signal may also be any number of channels.

In addition, the special reproduction mode signals may be generated for any number of channels.

What is claimed is:

1. A compressed television signal sequential-access recording and reproducing apparatus comprising:

table-of-contents data extracting means for extracting at least one representative image frame from among a plurality of frames of an input compressed television signal, identifiable by specified additional information, and table-of-contents generating means for generating table-of-contents data of a specified number of said representative image frames, said table-of-contents data including image data corresponding to each of said specified number of said representative image frames;

arrangement means for arranging an input compressed television signal at a first specified position of a sequential-access recording medium, for arranging said table-of-contents data at a second specified position of the recording medium, and for arranging positional information relating to a recorded position of each individual representative image frame at a third specified position of the recording medium; and recording means for recording at least said input compressed television signal, said table-of-contents data, and said positional information relating to a recorded position for each representative image frame, arranged by said arrangement means, onto the recording medium.

2. The compressed television signal sequential-access recording and reproducing apparatus according to claim 1, said arrangement means repeatedly arranging said table-of-contents data a plural number of times.

3. The compressed television signal sequential-access recording and reproducing apparatus according to claim 1, said table-of-contents data generating means comprising means for formatting said table-of-contents data in a data format decodable by a decoding device associated with said input compressed television signal.

4. The compressed television signal sequential-access recording and reproducing apparatus according to claim 1, each said representative image frame comprising image picture data, and said table-of-contents data generating means further generating said table-of-contents data from at least a part of said image picture data associated with each said representative image frame.

5. The compressed television signal sequential-access recording and reproducing apparatus according to claim 1, said table-of-contents data generating means comprising means for generating audio data for reproducing sound during display of table of contents formed from said table-of-contents data, and means for generating image picture data of each said representative image frame.

6. The compressed television signal sequential-recording and reproducing apparatus according to claim 1, said second specified position of the recording medium for recording said table-of-contents data and said third specified position of the recording medium for recording said positional information of each said individual representative image frame comprising writable data areas for rewriting said table-of-contents data and said positional information independently of said first specified position of the recording medium for recording said input compressed television signal.

7. The compressed television signal sequential-access recording and reproducing apparatus according to claim 1, each said representative image frame and said compressed television signal comprising image picture data, and said table-of-contents data generating means comprising means for reproducing said image picture data of each said representative image frame from image picture data of said compressed television signal that has previously been recorded on the recording medium, and said table-of-contents data comprising said image picture data of said specified number of said representative image frames.

8. The compressed television signal sequential-access recording and reproducing apparatus according to claim 1, said recording means records, at a predetermined position in the recording medium, switching information for switching between a reproduction output of said table-of-contents data and a reproduction output of said input compressed television signal in an output operation process.

9. A compressed television signal sequential-access recording and reproducing apparatus comprising:

table-of-contents data reproducing means for reproducing image data of at least one representative image frame of a compressed television signal previously recorded on a recording medium, said at least one representative image frame identifiable by identification information, and table-of-contents generating means for generating table-of-contents data of a specified number of said representative image frames, said table-of-contents data including image data corresponding to each of said specified number of said representative image frames;

arrangement means for arranging said input compressed television signal at a first specified position of a sequential-access recording medium, for arranging said table-of-contents data at a second specified position of the recording medium, and for arranging said identification information for identifying each said representative image frame at a third specified position of the recording medium; and recording means for recording at least said input compressed television signal, said table-of-contents data, and said identification information arranged by the arrangement means.

10. The compressed television signal sequential-access recording and reproducing apparatus according to claim 9, said arrangement means repeatedly arranges said table-of-contents data at least one time.

11. The compressed television signal sequential-access recording and reproducing apparatus according to claim 9, said table-of-contents data generating means comprising means for formatting said table-of-contents data in a data format decodable by a decoding device associated with said input compressed television signal.

12. The compressed television signal sequential-access recording and reproducing apparatus according to claim 9, each said representative image frame comprising image picture data, and said table-of-contents data generating means further for generating said table-of-contents data from at least a part of said image picture data associated with each said representative frame.

13. The compressed television signal sequential-access recording and reproducing apparatus according to claim 9, said table-of-contents data generating means comprising means for generating audio data for reproducing sound during display of a table of contents formed from said table-of-contents data, and means for generating said image data of each said representative image frame.

14. The compressed television signal sequential-access recording and reproducing apparatus according to claim 9, said second specified position of the recording medium for recording said table-of-contents data and said third specified position of the recording medium for recording said identification information for identifying each said representative image frame comprising rewritable data areas for rewriting said table-of-contents data and said identification information independently of said first specified position of the recording medium for recording input compressed television signal.

15. The compressed television signal sequential-access recording and reproducing apparatus according to claim 9, each said representative image frame and said compressed television signal comprising image picture data, and said table-of-contents data generating means comprising means for reproducing said image picture data associated with each said representative image frame from said image picture data of said compressed television signal that has previously been recorded on the recording medium, and said table-of-contents data based on said image picture data of said specified number of said representative image frames.

16. The compressed television signal sequential-access recording and reproducing apparatus according to claim 9, said recording means records, at a predetermined position in the recording medium, switching information for switching between a reproduction output of said table-of-contents data and a reproduction output of said input compressed television data in an output operation process.

17. A compressed television signal sequential-access recording and reproducing apparatus comprising:
    reproducing means for obtaining reproduction data by reproducing television signal data recorded on a recording medium;
    table-of-contents data output means for outputting recorded table-of-contents data to exhibit contents of a plurality of representative image frames of said television signal data recorded at different positions in the recording medium, said table-of-contents data including image data corresponding to each of said plurality of said representative image frames;
    selection information acquiring means for acquiring information from an external device, said information identifying a selected one of said plurality of representative image frames having contents exhibited by said table-of-contents data output means;
    positional information extracting means for extracting positional information relating to a recorded position of television signal data associated with said selected one of said plurality of representative frames selected by said selection information acquiring means; and
    search means for searching for said recorded position on the recording medium associated with said selected one of said plurality of representative image frames in accordance with the extracted positional information; and
    means for reproducing said selected one of said plurality of representative image frames beginning at said recorded position on the recording medium.

18. The compressed television signal sequential-access recording and reproducing apparatus according claim 17, further comprising:
    signal generating means for generating a compressed television signal during a search in a recording medium; and
    output means for delivering an output of said signal generating means to said external device.

19. The compressed television signal sequential-access recording and reproducing apparatus according to claim 18, said signal generating means comprising means for generating said compressed television signal, said compressed television signal comprising video data for displaying, in a frame, information indicating a position in the recording medium which is currently being searched for.

20. The compressed television signal sequential-access recording and reproducing apparatus according to claim 17, said table-of-contents output means simultaneously exhibiting said contents of said plurality of representative frames.

21. A compressed television signal sequential-access recording and reproducing apparatus comprising:
    reproducing means for obtaining reproduction data by reproducing television signal data recorded in a recording medium;
    table-of-contents data output means for outputting table-of-contents data recorded at a predetermined position in the recording medium, said table-of-contents data including image data corresponding to each of a plurality of a representative image frames of said television signal data recorded at different positions in the recording medium;
    exhibiting means for exhibiting contents of said plurality of representative image frames of said television signal data selected from among said reproduction data;
    external selecting means for selecting one of said plurality of representative image frames having contents exhibited by said exhibiting means;
    selection information acquiring means for acquiring information from said external selecting means; and
    output means for delivering an output signal of said selected one of said plurality of representative image frames selected by said selection information acquiring means.

22. The compressed television signal sequential-access recording and reproducing apparatus according to claim 21, said table-of-contents data output means being switchably connected to an output of said table-of-contents data when one of: a predetermined operation from said external selecting means occurs; and switching information is present in the reproduction data.

23. A compressed television signal sequential-access recording and reproducing apparatus comprising:
    reproduction means for obtaining reproduction data by reproducing television signal data recorded in a recording medium;
    table-of-contents data output means for outputting table-of-contents data recorded at a specified position in the recording medium, said table-of-contents data including image data corresponding to each of said plurality of said representative image frames of said television signal data recorded at different positions in the recording medium;
    exhibiting means for exhibiting contents of said plurality of representative image frames;
    selection information acquiring means for acquiring information, from an external device, associated with a selected one of said plurality of representative image frames exhibited by the table-of-contents data out means;
    identification information extracting means for extracting identification information for identifying television signal data of said selected one of said plurality of representative image frames selected by said selection information acquiring means;
    identification means for identifying a reproduction signal by using said identification information; and
    output means for outputting a reproduction output identified and extracted by said identification means from said reproduction signal.

24. The compressed television signal sequential-access recording and reproducing apparatus according to claim 23, said table-of-contents data output means being switchably connected to receive said table-of-contents data when one of: a predetermined operation from said external device occurs; and switching information is present in the reproduction data.

25. A compressed television signal sequential-access recording and reproducing apparatus comprising:
- a table-of-contents data extracting device that extracts at least one representative image frame from among a plurality of frames of an input compressed television signal, identifiable by specified additional information;
- a table-of-contents generator that generates table-of-contents data of a specified number of said representative image frames, said table-of-contents data including image data corresponding to each of said specified number of said representative image frames;
- an arranging device that arranges an input compressed television signal at a first specified position of a recording medium, said table-of-contents data at a second specified position of the recording medium, and positional information relating to a recorded position of each individual representative image frame at a third specified position of the recording medium; and
- a recording device that records at least said input compressed television signal, said table-of-contents data, and said positional information relating to a recorded position for each representative image frame, arranged by said arrangement means, onto the recording medium.

26. The compressed television signal sequential-access recording and reproducing apparatus according to claim 25, said arranging device repeatedly arranging said table-of-contents data a plurality of times.

27. The compressed television signal sequential-access recording and reproducing apparatus according to claim 25, said table-of-contents data generator comprising a system that formats table-of-contents data in a data format decodable by a decoding device associated with said input compressed television signal.

28. The compressed television signal sequential-access recording and reproducing apparatus according to claim 25, each said user selected representative frame comprising image picture data, and said table-of-contents data generator further generating said table-of-contents data from at least a part of said image picture data associated with each said user selected representative frame.

29. The compressed television signal sequential-access recording and reproducing apparatus according to claim 25, said table-of-contents data generator comprising an audio data generator that reproduces sound during display of a table of contents, and an image picture data generator that generates an image of each said user selected representative frame.

30. The compressed television signal sequential-access recording and reproducing apparatus according to claim 25, said second specified position of the recording medium for recording said table-of-contents data and said third specified position of the recording medium for recording said positional information of each said user selected individual representative frame comprising writable data areas for rewriting said table-of-contents data and said positional information independently of said first specified position of the recording medium for recording said input compressed television signal.

31. The compressed television signal sequential-access recording and reproducing apparatus according to claim 25, each said user selected representative frame and said compressed television signal comprising image picture data, and said table-of-contents data generator comprising a reproducing system that reproduces said image picture data of each said user selected representative frame from image picture data of said compressed television signal that has previously been recorded on the recording medium, and said table-of-contents data comprising said image picture data of said specified number of said user selected representative frames.

32. The compressed television signal sequential-access recording and reproducing apparatus according to claim 25, wherein said recording device records, at a predetermined position in the recording medium, switching information for switching between a reproduction output of said table-of-contents data and a reproduction output of said input compressed television signal in an output operation process.

33. A compressed television signal sequential-access recording and reproducing apparatus comprising:
- a reproducing device that reproduces television signal data recorded on a recording medium;
- a table-of-contents data output device that outputs recorded table-of-contents data to exhibit contents of a plurality of representative image frames of said television signal data recorded at different positions in the recording medium, said table-of-contents data including image data corresponding to each of said plurality of said representative image frames;
- a selection information acquiring device that acquires information from an external device, said information identifying a selected one of said plurality of representative image frames having contents exhibited by said table-of-contents data output device;
- a positional information extracting device that extracts positional information relating to a recorded position of television signal data associated with said selected one of said plurality of representative frames selected by said selection information acquiring device; and
- a searching device that searches for said recorded position on the recording medium associated with said selected one of said plurality of representative image frames in accordance with the extracted positional information, said reproducing device reproducing said selected one of said plurality of representative image frames beginning at said recorded position on the recording medium.

* * * * *